United States Patent
Claessens et al.

(10) Patent No.: US 10,491,124 B2
(45) Date of Patent: Nov. 26, 2019

(54) BIFRED CONVERTER AND A METHOD OF DRIVING AN OUTPUT LOAD

(71) Applicant: SIGNIFY HOLDING B.V., Eindhoven (NL)

(72) Inventors: Dennis Johannes Antonius Claessens, Eindhoven (NL); Hui Zhang, Eindhoven (NL); Hong Jiang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/300,031

(22) PCT Filed: May 10, 2017

(86) PCT No.: PCT/EP2017/061183
§ 371 (c)(1),
(2) Date: Nov. 8, 2018

(87) PCT Pub. No.: WO2017/198512
PCT Pub. Date: Nov. 23, 2017

(65) Prior Publication Data
US 2019/0149051 A1    May 16, 2019

(30) Foreign Application Priority Data

May 16, 2016 (WO) ............... PCT/CN2016/082192
Jul. 26, 2016 (EP) ............................ 16181174

(51) Int. Cl.
*H02M 3/335* (2006.01)
*H05B 33/08* (2006.01)
(Continued)

(52) U.S. Cl.
CPC ........ *H02M 3/33507* (2013.01); *H02M 1/08* (2013.01); *H02M 1/14* (2013.01);
(Continued)

(58) Field of Classification Search
CPC ............ H05B 33/0815; H05B 33/0851; H05B 33/0845; H05B 33/0818; H05B 33/08;
(Continued)

(56) References Cited

U.S. PATENT DOCUMENTS

2011/0182088 A1* 7/2011 Lidak ............... H02M 3/33507
363/21.12
2014/0301116 A1   10/2014 Zhang et al.

FOREIGN PATENT DOCUMENTS

WO    WO2015180989 A1    12/2015

OTHER PUBLICATIONS

M.M. Jovanovic, et al., "Reduction of Voltage Stress in Integrated High-quality Rectifier-Regulators by Variable-Frequency Control", DELTA Power Electronics Lab., Inc., Blacksburg, VA, USA, IEEE, 1994, pp. 569-575.
(Continued)

*Primary Examiner* — Wei (Victor) Y Chan
(74) *Attorney, Agent, or Firm* — Daniel J. Piotrowski

(57) ABSTRACT

A boost integrated flyback (BiFRED) converter which has a current sensing element (R2) in series with the energy storage device (C1) of the converter for sensing a boost portion current and a discharging flyback portion current. A feedback circuit (54) processes the sensed current to derive a control signal which is then used for adjusting the time duration for which the switching element (S1) of the BiFRED converter is switched on based on the control signal. This arrangement makes use of primary side current sensing to modify standard on-time control so that the current ripple in the output can be suppressed.

15 Claims, 8 Drawing Sheets

(51) Int. Cl.
*H02M 1/08* (2006.01)
*H02M 1/14* (2006.01)
*H02M 1/00* (2006.01)
*H05B 37/02* (2006.01)

(52) U.S. Cl.
CPC ............ *H02M 3/335* (2013.01); *H05B 33/08* (2013.01); *H05B 33/0815* (2013.01); *H02M 2001/007* (2013.01); *H02M 2001/0009* (2013.01)

(58) Field of Classification Search
CPC .............. H05B 33/0812; H05B 33/089; H05B 33/0848
See application file for complete search history.

(56) References Cited

OTHER PUBLICATIONS

M.T. Madigan, et al., "Integrated High-Quality Recifier-Regulators", IEEE Transactions on Industrial Electronics, vol. 46, No. 4, Aug. 1999, pp. 749-758.
V. Tuomainen, et al., "Comparison of three Single-Stage Solutions for Low Cost PFC", EPE 1999—Lausanne, pp. 1-10.

\* cited by examiner

BIFRED CONVERTER AND A METHOD OF DRIVING AN OUTPUT LOAD

CROSS-REFERENCE TO PRIOR APPLICATIONS

This application is the U.S. National Phase application under 35 U.S.C. § 371 of International Application No. PCT/EP2017/061183, filed on May 10, 2017, which claims the benefits of European Patent Application No. 16181174.0, filed on Jul. 26, 2016, and Chinese Patent Application No. PCT/CN2016/082192, filed on May 16, 2016. These applications are hereby incorporated by reference herein.

FIELD OF THE INVENTION

The present invention relates to a BiFRED converter, for example for use in the field of lighting, particularly LED lighting. The present invention relates more particularly to a driver for an LED lamp, although such a driver can also be used for other types of load.

BACKGROUND OF THE INVENTION

LED lighting technology is developing rapidly. Especially, LEDs are becoming available at decreasing prices. For use in LED lighting appliances, there is a general desire to provide low-cost LED drivers. Reducing the cost can for instance be done by reducing the number of components, and single-stage driver architectures are preferred. However, with increasing LED power, the drivers must meet more stringent requirements relating to distortion of the line current. Although low line current distortion is feasible with single stage architectures, there often is a trade-off between load regulation and line regulation, line-current-distortion and output ripple (flicker) and the corresponding buffer size and cost.

Although it is easy to meet high power factor requirement, low total harmonic distortion and good line/load regulation, it is very difficult to solve the output current ripple (e.g. at 100 Hz or 200 Hz) even using a very large output buffer capacitor.

According to technical investigations, the issue of flicker can be considered to be solved if the output current low frequency ripple is lower than 4%. Generally a dual-stage topology that means an AC/DC Boost converter and a DC/DC flyback converter are used. This topology has a high cost and component count due to the duplication of high voltage switches and control circuits.

A well-known single-stage driver topology (or sometimes it is referred to as a 1.5 stage converter) is the BiFRED topology (Boost Integrated Flyback Rectifier/Energy storage DC/DC converter).

FIG. 1A is a block diagram schematically showing a non-isolated BiFRED converter 1 powered from the mains 2 for driving an LED load L. Reference numeral 3 indicates a rectifier, reference numeral 4 indicates an EMI filter. The actual converter comprises a series arrangement of a first diode D1, a first inductor L1, a storage capacitor C1 and a second inductor L2 connected between first and second input terminals 5 and 6. The input terminals 5 and 6 are connected to the output of the filter 4.

It is noted that the order of first diode D1 and first inductor L1 may be different. It is further noted that the order of storage capacitor C1 and second inductor L2 may be different. It is further noted that the direction of the first diode D1 determines the direction of current flow, and hence determines the mutual polarity of the input terminals. For sake the of convenience, the first input terminal 5 will be termed a "high" input terminal while the second input terminal 6 will be termed the "low" input terminal.

Reference numeral A indicates a node between first inductor L1 and the series arrangement of storage capacitor C1 and second inductor L2. A controllable switch S1 is connected between the node A and the low input terminal 6.

The converter 1 further comprises, connected in parallel to the second inductor L2, a series arrangement of a second diode D2 and a parallel arrangement of an output capacitor C2 and the LED load L. Reference numerals 9a and 9b indicate output terminals for connecting the load. It is noted that the converter can also be used for other types of load.

Reference numeral 8 indicates a control device for the switch S1. The control device controls the switch S1 to be either conductive (first state) or non-conductive (second state), and alternates between these two states at a certain repetition frequency.

The basic operation is as follows. During the first state, the switch is conductive and the first inductor L1 is charged from rectified mains via the switch S1. The energy in the first inductor L1 is magnetic energy which is proportional to the inductor current. The inductor current is increasing.

During the second stage, the switch is non-conductive, the inductor current continues to flow, discharging the first inductor L1 and charging the storage capacitor C1. The current in the first inductor L1 decreases, while the voltage over the storage capacitor C1 increases. The charging current from L1 to C1 also flows partly through the second inductor L2 and partly via the second diode D2 to power the LED and to charge the output capacitor C2.

During the first stage, the storage capacitor C1 also discharges over the second inductor L2, via the switch S1. During the second stage, the energy stored in the second inductor L2 will be used to charge output capacitor C2 and to power the LED.

FIG. 1B is a schematic diagram showing an alternative embodiment of the converter, indicated by reference numeral 11. In this alternative embodiment, the second inductor L2 is the primary winding of a transformer T1 which has a secondary winding L3 connected to the second diode D2. This is an isolated BiFRED converter. An advantage of using such transformer is that the primary and secondary windings may be mutually isolated such as to provide an insulation between the input and output, and the respective numbers of turns may have a ratio higher than 1 such as to provide a voltage increase at the output, but otherwise the operation is the same as described above.

For a correct operation of the converter, the timing of the switching moments from a first state to a second state and from the second state to the first state is important. The control device may operate at an arbitrary high frequency, but in view of the fact that the charging current is derived from rectified mains, the current in the load may have a frequency component (ripple) equal to twice the mains frequency. Typically, the mains frequency is for instance 50 Hz (Europe) or 60 Hz (USA), and consequently the LED light output may have a ripple frequency of 100 or 120 Hz. This is observable, and therefore it is desirable that the magnitude of the ripple current is as low as possible.

Further, the power drawn from the mains must be proportional to the power consumed by the load L, and this is achieved by adapting the duty cycle of the switching control, wherein an increase in the relative duration of the first state corresponds to an increase in power.

A typical approach in known single-stage PFC LED drivers is to place the buffering, or 100 Hz/120 Hz flicker filtering, at the output of the DC/DC converter because placing significant buffering at the input of the converter would depreciate the power factor and increase the line current distortion. The output buffer typically consists of a large output capacitor C2 which forms a time constant with the dynamic resistance of the LEDs. To improve LED efficacy, LED manufacturers have consistently reduced the dynamic resistance of LEDs over the last decade, which has caused the required output buffer size and cost to increase significantly.

An alternative is to provide feedback control of the converter output current so that the current ripple is prevented in a dynamic way. Two output current regulation methods are commonly used with BiFRED converters used within LED Drivers.

A first is peak current control. This method involves detecting the peak current at the primary side of the converter. Peak current control does not provide a constant output current with a BiFRED converter, but the method can be implemented with low component count and it can obtain middle level line/load regulation. However it is very difficult to meet 4% current ripple although using a large bulk capacitor.

A second method is closed loop control with secondary side current detection. A circuit for this closed loop method is shown in FIG. 2. The same references are used as in FIG. 1 for the same components.

The output current is sensed using a sense resistor R1 and the measured voltage across the sense resistor R1 is compared to a reference Vref at the secondary side of the converter using an error amplifier 20. The output of the control loop is passed to the primary side of the converter through an isolation barrier such as an opto-coupler 22.

Provided that the error amplifier 20 has sufficient open loop gain and very fast response time, this method provides very low output current ripple, so it is for example easy to meet a 4% ripple requirement. Unfortunately providing isolation in the control loop is quite costly.

There is therefore a need for a BiFRED converter which enables control of the output current ripple with a simple and low cost circuit.

SUMMARY OF THE INVENTION

In order to address the above concerns, it would be advantageous to have a primary side control mechanism that could reduce the current ripple without detecting and transmitting parameters at the secondary side.

A basic idea of the invention is sensing the ripple information of the mains input at the primary side and using this ripple information to adjust the turn on duration of the BiFRED converter. Said sensing is implemented by sensing the both the boost current from the boost portion and the discharging current at the flyback portion. More specifically, the invention is defined by the claims.

According to examples in accordance with an aspect of the invention, there is provided a boost integrated flyback (BiFRED) converter comprising:
an input having first and second terminals;
a boost portion comprising an inductor between one terminal of the input and a switching element; and
a flyback portion comprising a primary winding and a secondary winding, with an energy storage device in series with the primary winding of the flyback portion and an output having first and second terminals defined at the second side,
wherein the converter further comprises:
a current sensing element in series with the energy storage device for sensing an output current from the boost portion when said switching element is switched off and a current discharged from the energy storage device when said switching element is switched on;
a feedback circuit for processing the sensed current to derive a control signal; and
a controller for adjusting the time duration for which the switching element is switched on based on the control signal.

This arrangement makes use of primary side current sensing so that there is no need for signal isolation in the feedback path. Further, the sensed current of both the boost charging current and the flyback discharging current can provide accurate information about the mains ripple. Based on this sensed current, it provides a modification to standard on-time control by adapting the on-time based on processing and feeding back the current flowing through the primary winding. In this way, the current ripple can be suppressed, so that an output with low current ripple may be achieved with a low cost converter circuit.

A sense resistor is for example used to sense the boost current (when the switching element is off) and the current discharged by the energy storage device (when the switching element is on). The sensed current is then an AC current. The processing of the sensed current for example comprises low pass filtering and inverting. When the input voltage is high, the filtered sensed current is also high and the inverted signal is then low. This low inverted signal results in a decrease in the time duration. When the input voltage is high, this reduced time duration provides a stable output current. The aim of the circuit is to smooth the output current, based on the phase information of the AC input. The circuit may have an output with a current ripple of less than 4%.

The input may be adapted to receive an AC mains supply with variable amplitude, and the feedback circuit is adapted to provide the control signal at a first level when the AC mains supply is high and to provide the control signal at a second level when the AC mains supply is low, and wherein the controller is adapted to decrease the time duration when the control signal is at the first level and to increase the time duration when the control signal is at the second level, thereby smoothing the output. Of course, there may be continuous range of values between the control signals at the first and second levels, and these may be considered to be the end-point values of the control system.

The flyback portion for example also comprises the switching element, such that the switching element is shared between the boost portion and the flyback portion. This defines the known way in which the boost and flyback portions are integrated with a minimum of circuit components. It provides a low cost and low component count with high performance.

The boost portion may comprise an input diode between the inductor and the switching element, and the flyback portion comprises an output diode between the secondary winding and one terminal of the output.

The converter may comprise a rectifier between the input and the boost portion.

The converter is for example for connection at its input to mains, and generates a DC output for example with a regulated output current for driving a current driven load, such as LED lighting.

The current sensing element may comprise a sense resistor as mentioned above, connected between a reference potential and the energy storage device, wherein the voltage across the resistor is provided as an input voltage to the feedback element.

This enables a low cost and simple voltage-based processing circuit to be used to generate the feedback signal.

The feedback circuit may comprise a low pass filter and a voltage amplifier circuit with a gain which varies inversely with the filtered sensed current and in turn the input voltage.

In this way, the output current contribution from the flyback portion is modulated by having non-constant on-time control, in such a way that the flyback portion is modulated to compensate for the current modulation which arises in the boost portion. When the boost portion causes a current surge, the output of the feedback circuit is reduced. The on-time is then controlled to reduce the current contribution by the flyback stage.

The converter may further comprise an on-time modulation circuit for controlling the on-time of the switching element, wherein the on-time modulation circuit comprises a comparison circuit for comparing the output of the feedback circuit with a reference input.

The reference input may be used to set the operating point of the converter, and thereby set the desired output current. The modulation in the feedback element output signal is used to reduce ripple in the output current.

The invention also provides an LED driver comprising a converter as defined above.

The invention also provides a lighting circuit comprising:
an LED driver as defined above; and
an LED arrangement connected to the output of the LED driver.

Examples in accordance with another aspect of the invention provide a method for driving an output load using a BiFRED converter, comprising:
implementing boost conversion using a boost portion of the converter comprising an inductor between one terminal of an input to the boost portion and a switching element;
implementing flyback conversion using a flyback portion comprising a primary winding and a secondary winding, with an energy storage device in series with the primary winding of the flyback portion, and an output defined at the second winding side;
sensing the output current from the boost portion when said switching element is switched off and a current discharged from the energy storage device when said switching element is switched on;
processing the sensed current to derive a control signal; and
adjusting the time duration for which the switching element is turned on based on the control signal.

This method makes use of primary side current sensing so that there is no need for signal isolation in the feedback path, but it still enables significant output current smoothing. The method is adapted to receive an AC mains supply with variable instantaneous amplitude, wherein the step of processing is adapted to provide the control signal at a first level when the AC mains supply is at a first instantaneous amplitude and to provide the control signal at a second level when the AC mains supply is at a second instantaneous amplitude lower than said first instantaneous amplitude, wherein the step of adjusting is adapted to decrease the time duration when the control signal is at the first level and to increase the time duration when the control signal is at the second level, thereby to smooth the output The method may comprise providing a voltage across a resistor, connected between a reference potential and the energy storage device, as an input voltage representing the sensed current. The input voltage may be amplified with a gain which varies inversely with the input voltage. The on-time of the switching element is for example modified based on comparing the processed sensed current with a reference input. The reference input may be used to set the output current level, and the control signal is used to suppress current ripple.

The method is for example used for driving current through an LED load.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a boost integrated flyback (BiFRED) converter which has a current sensing element in series with the energy storage device of the converter for sensing a boost portion current and a flyback discharging current. A feedback circuit processes the sensed current to derive a control signal which is then used for adjusting the time duration for which the switching element is switched on based on the control signal. This arrangement makes use of primary side current sensing to modify standard on-time control so that the current ripple in the output can be suppressed.

Figure 1A:
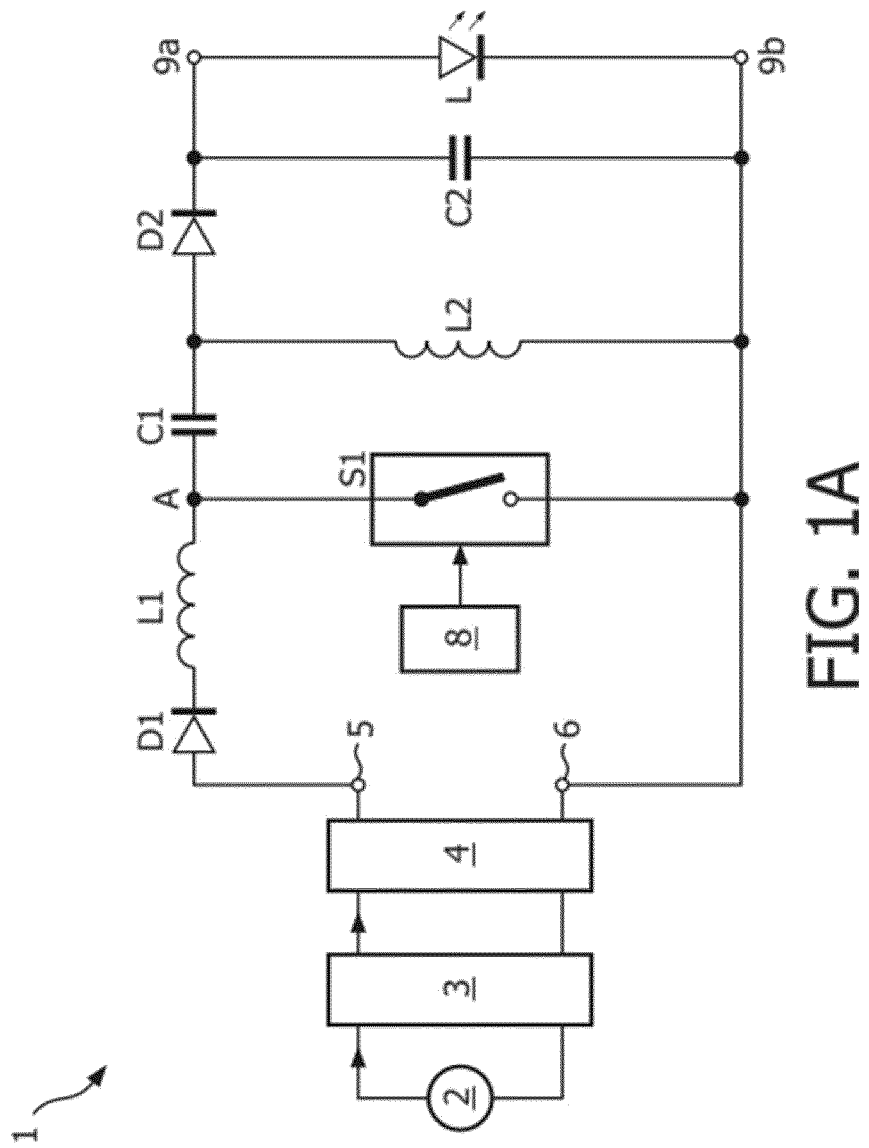
FIG. 1A shows a first example of a known BiFRED converter.
Figure 1B:
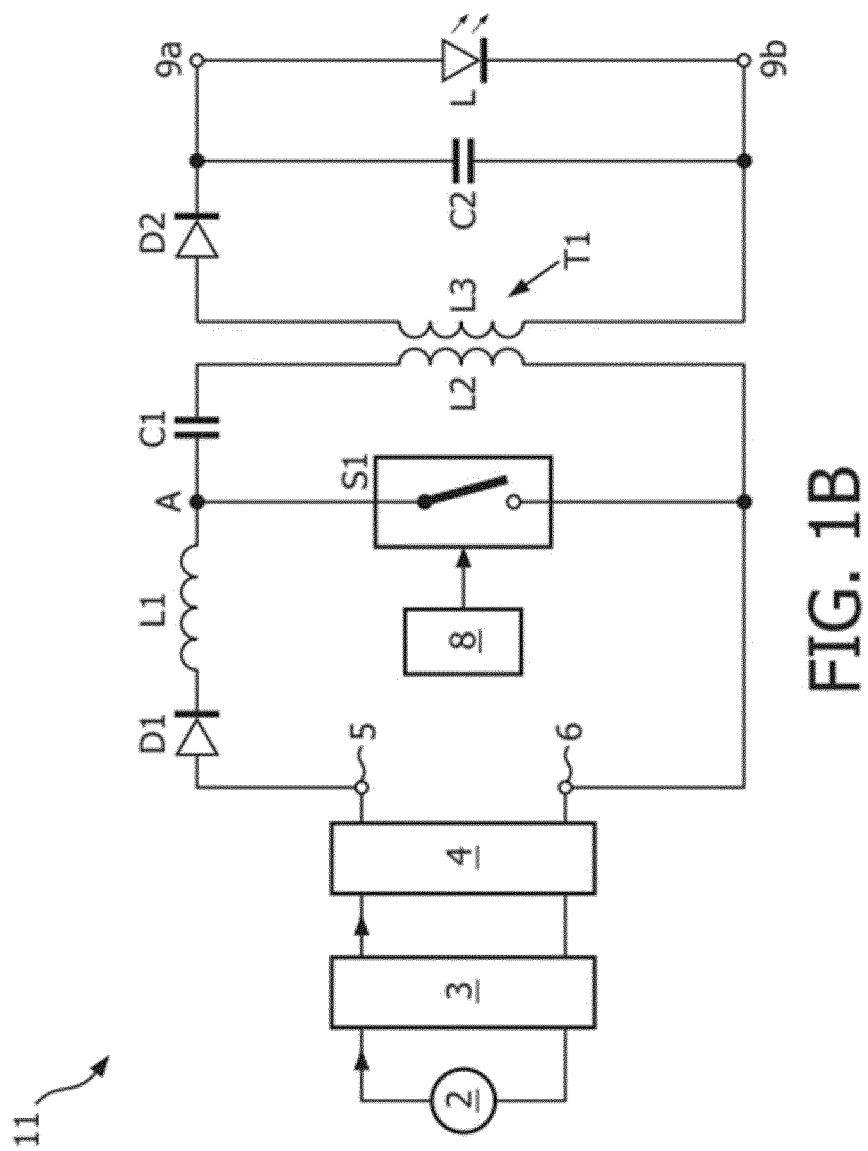
FIG. 1B is shows a second example of a known BiFRED converter.

The invention is based on modifying a known on-time control scheme for a BiFRED converter architecture, for example based on the architecture shown in FIG. 1B. In FIG. 1B, constant on-time control is used to obtain a high power factor and low total harmonic distortion, but gives high output current ripple.

Figure 3B:
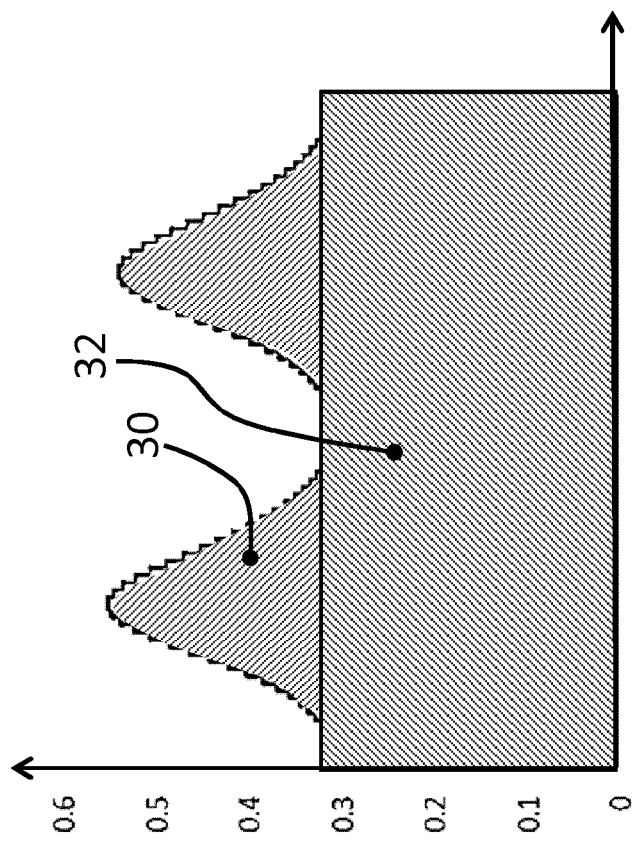
FIGS. 3A-B show current output waveforms for the converter of FIG. 2.
Figure 3A:
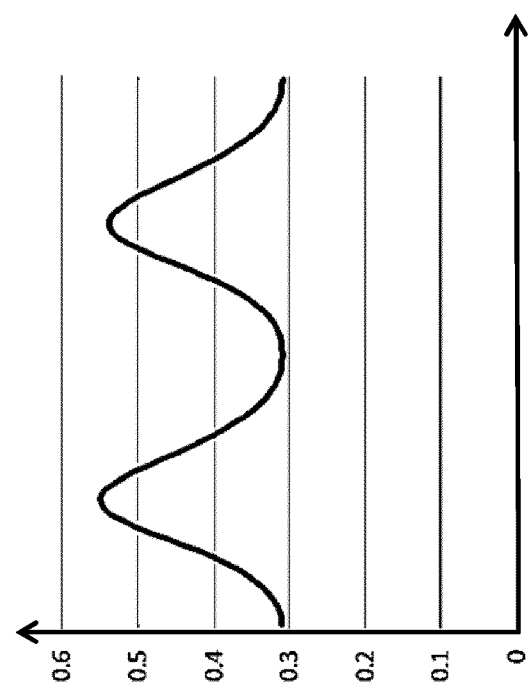

FIG. 3 shows the basic waveforms which result from constant on-time control. FIG. 3A shows the LED output current. FIG. 3B shows the contribution to the output current from the boost stage as region 30 and from the flyback power stage as region 32.

FIG. 4 shows how the waveforms of FIG. 3 may be modified using a circuit and method in accordance with examples of the invention. The on-time is modified cycle by cycle so that there is on-time control with modulation to reduce the output current ripple. The switching frequency of the converter is typically in the kHz range, so that modulation of the on-time control is easily achievable within the time duration of individual cycles of the (rectified) mains input signal.

The low frequency (mains) shape of the current flowing through the bulk capacitor C1 (see FIG. 1B) is used as a control parameter for the modulation of the on-time, in order to compensate the output current.

Figure 4A:
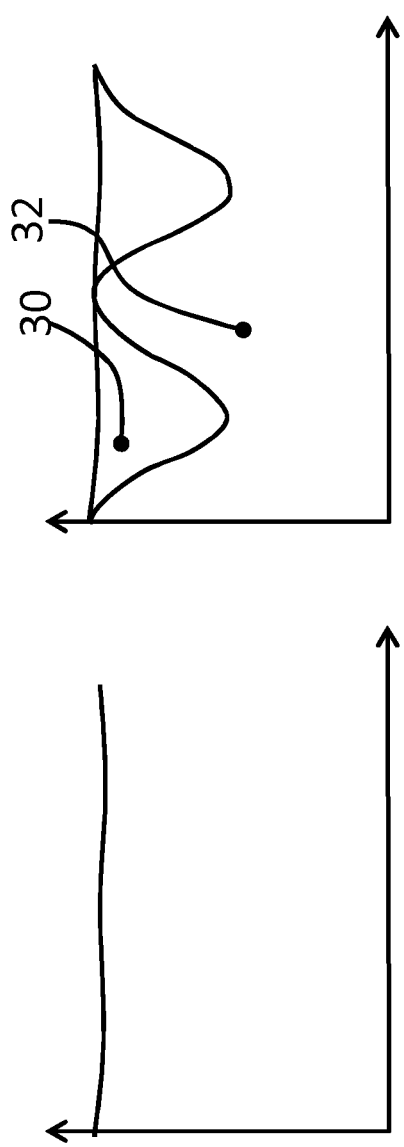
FIGS. 4A-B show desired improved current waveforms.

FIG. 4A shows the resulting output current and the contribution 30 of the boost portion and the contribution 32 of the flyback portion.

Figure 4B:
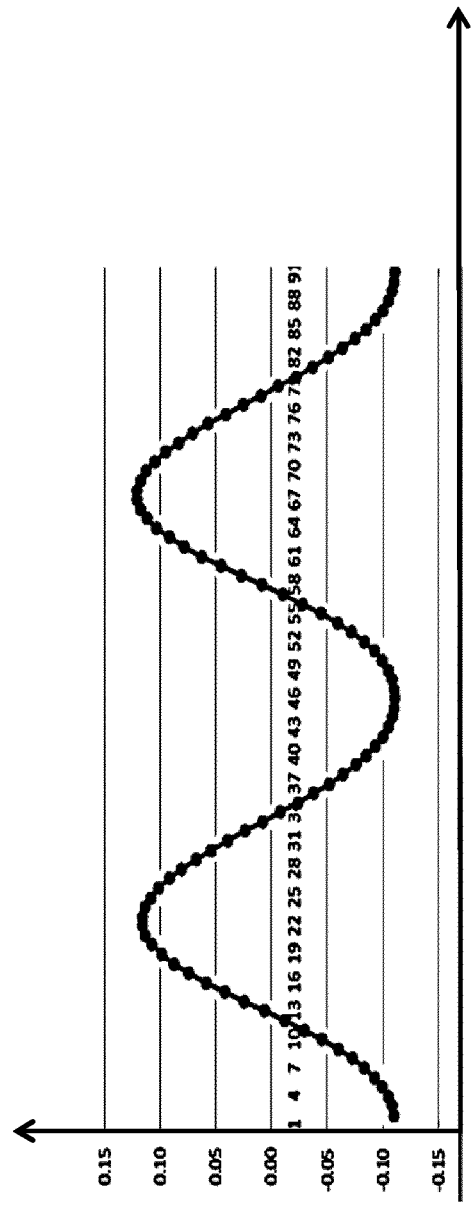

FIG. 4B shows a low frequency component of the capacitor current on the flyback portion. This low frequency component can be used for compensating the output waveform in FIG. 3B to obtain very low LED output current ripple.

Figure 2:
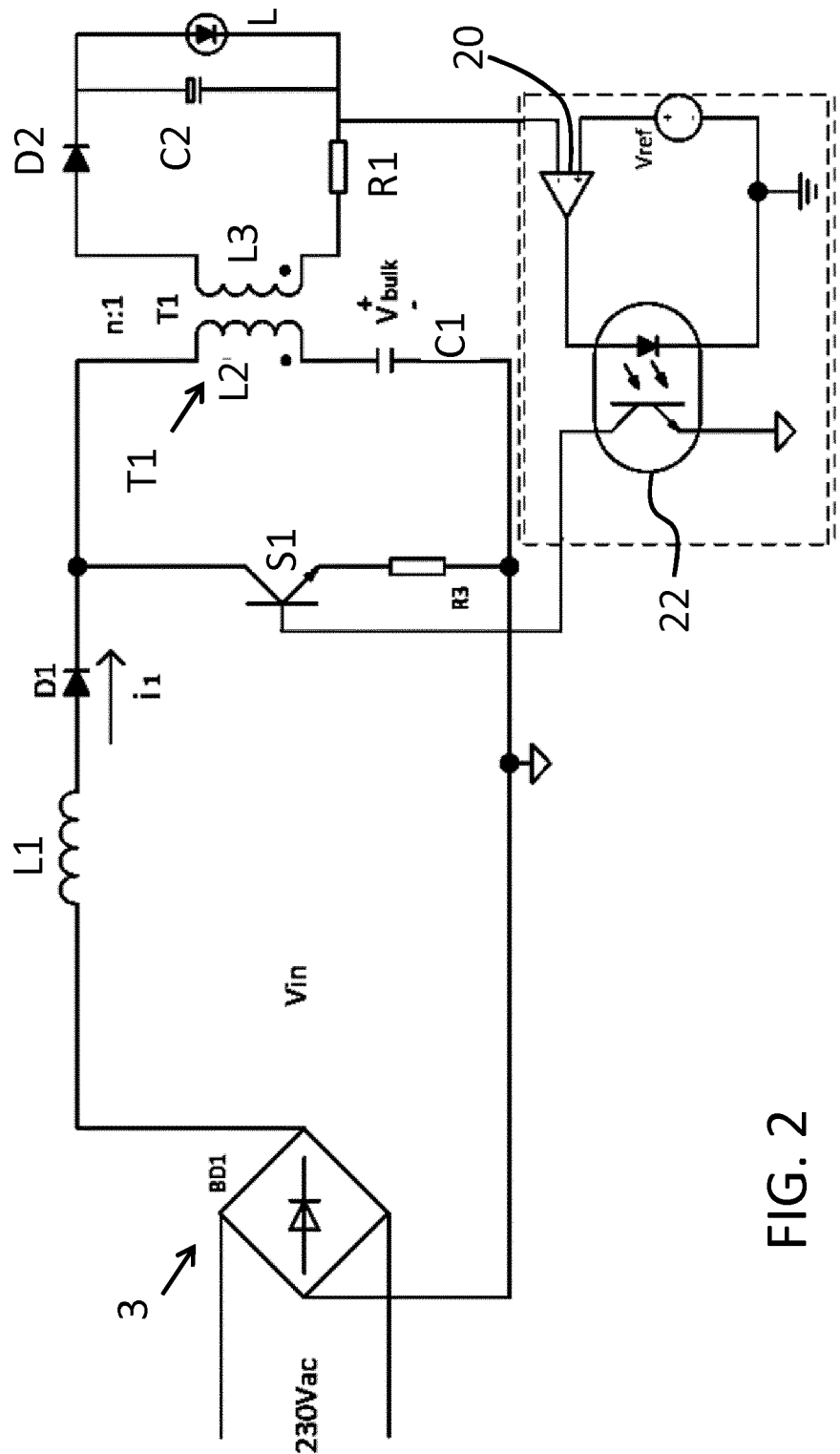
FIG. 2 shows a third example of a known BiFRED converter with feedback from an isolated output stage.
Figures 5, 6:
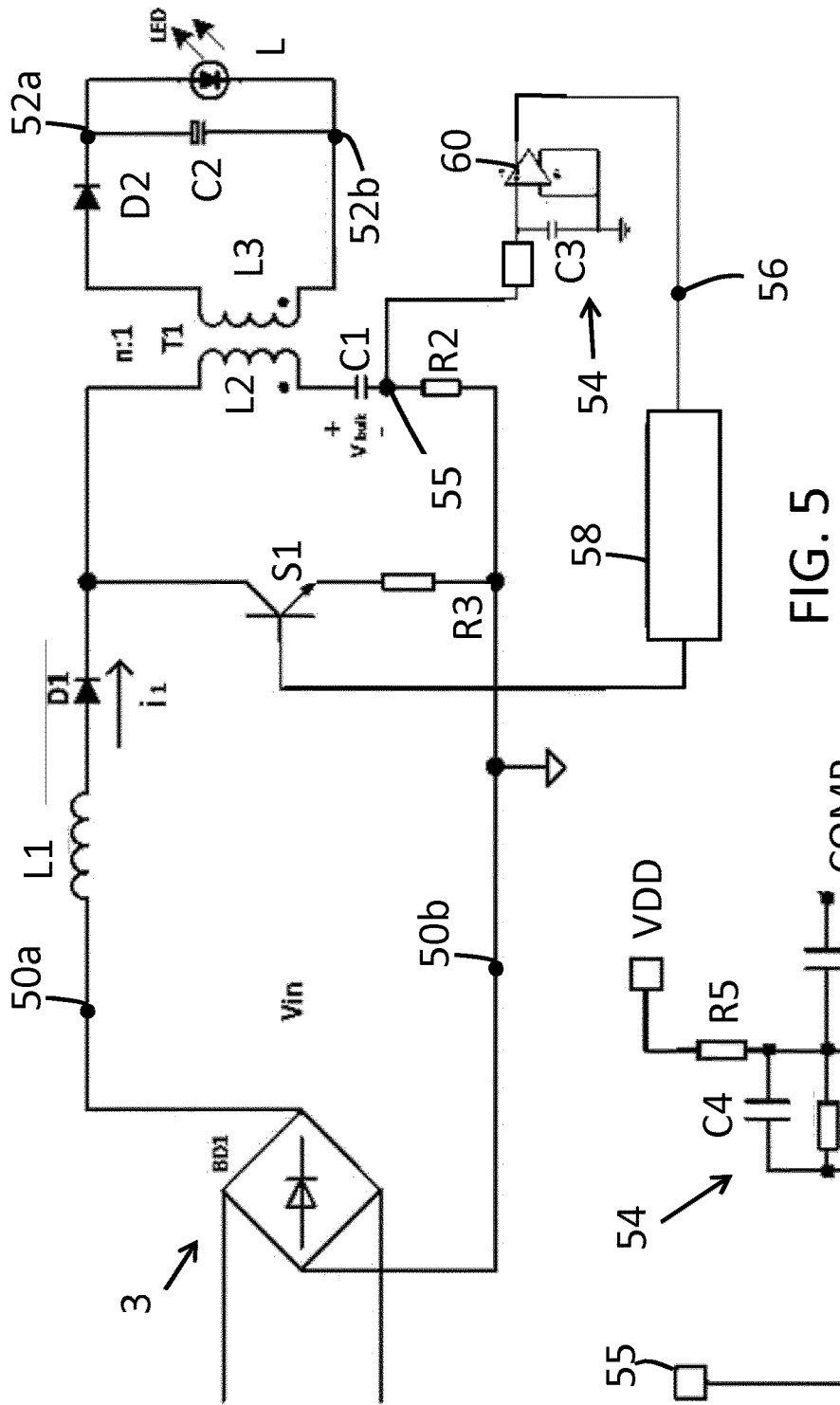
FIG. 5 shows a BiFRED converter.
FIG. 6 shows an example of the feedback circuit used in the converter of FIG. 5.

FIG. 5 shows the converter circuit. The same components as in FIG. 1B or FIG. 2 are given the same reference numbers.

The circuit comprises a boost integrated flyback (BiFRED) converter having first and second terminals 50a, 50b. These receive a rectified mains signal from a rectifier 3.

A boost portion comprises an inductor L1 and a diode D1 between one terminal 50a of the input and the switching element S1, and a flyback portion has a primary winding L2 and a secondary winding L3 of a transformer T1, with an energy storage device C1 (a bulk capacitor in this example) in series with the primary winding L2 of the flyback portion. The converter has an output having first and second terminals 52a, 52b defined at the second side of the transformer. The flyback portion comprises an output diode D2 between the secondary winding L3 and one terminal 52a of the output.

The switching element S1 is common to both the boost portion and the flyback portion.

Figure 8:
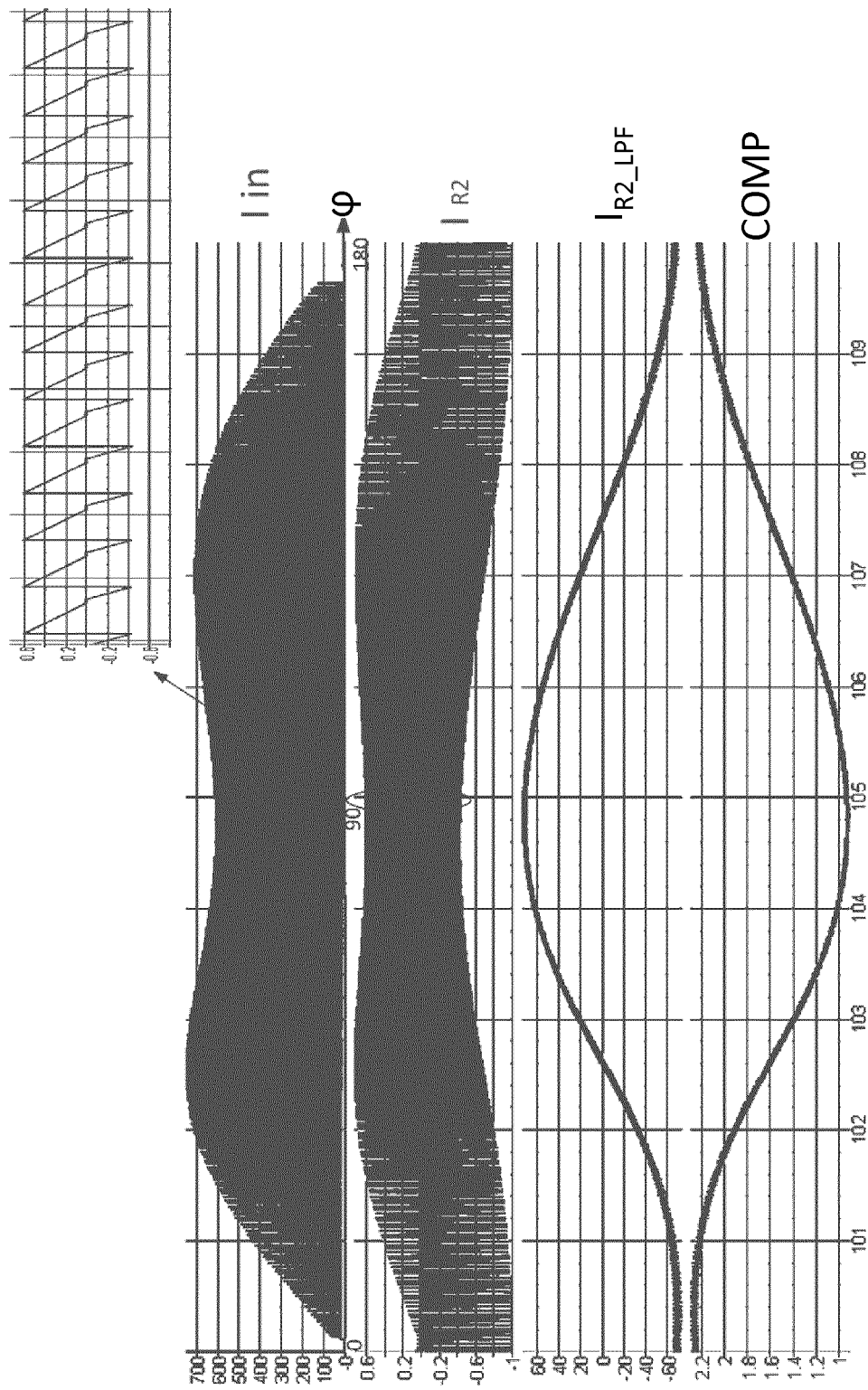
FIG. 8 shows enlarged portions of some of the waveforms of FIG. 7.

A current sensing element in the form of a resistor R2 in this example is in series with the bulk capacitor C1 for sensing an output current from the boost portion when the switching element S1 is switched off and for sensing a flyback portion current discharged from the bulk capacitor C1 when the switching element S1 is switched on. The current sense resistor R2 is thus for sensing the current waveform of $I_{R2}$ in FIG. 8. It is connected to a reference terminal (ground in this example) and a voltage across the sense resistor is representative of the current flowing. This voltage is present at a sense node 55.

A feedback circuit 54 processes the sensed current (i.e. the voltage present at sense node 55) and derives a control signal 56.

A controller 58 is then used to adjust the time duration for which the switching element S1 is switched on based on the control signal 56.

There is primary side current sensing so that there is no need for signal isolation in the feedback path.

The controller 58 comprises the known on-time control circuit, supplemented with the additional current sensing input. In particular, the controller 58 has a reference input (not shown) for setting the overall output current level. In a conventional on-time control system there is an constant on-time controller IC, which has a comparator input "COMP". This generally carries a DC level which determines the on-time duty cycle, for example based on feedback of an output voltage or current and comparison with a reference value. This DC value, which is obtained based on feedback control, can then be modulated with the low frequency "COMP" signal as explained above to provide converter control during the mains cycles.

The controller 58 thus provides a modification to standard on-time control by adapting the on-time based on processing and feeding back the current flowing through the primary winding L2. In this way, the current ripple can be suppressed, so that an output with low current ripple may be achieved with a low cost converter circuit.

The sense resistor R2 senses both the boost current (when the switching element is off, and flowing to ground through the resistor) and the current discharged by the energy storage device (when the switching element is on, and flowing away from ground through the resistor). The sensed current is thus an AC current.

The feedback circuit comprises a low pass filter stage implemented by capacitor C3 and an inverting amplifier 60. The signal sensed by the resistor R2 and filtered by the low pass filter is shown as $I_{R2\text{-}LPF}$ in FIG. 8. The inverted signal is shown as COMP in FIG. 8. When the input voltage is high (i.e. a high current is sensed), the inverted signal is then low and there is a decrease in the on-time duration. This short duration provides a stable output current.

As seen in FIG. 4B, the filtered capacitor current follows the phase of the AC mains supply. Thus, a first control signal results when the AC mains supply is high and a second control signal results when the AC mains supply is low. When the AC mains signal is high, the time duration is decreased, and the when the AC mains signal is low, the time duration is increased.

FIG. 6 shows an inverting amplifier circuit for implementing the feedback circuit 54. A transistor has a negative feedback resistor R4 for setting the gain value. A DC bias resistor R5 sets the circuit operating point, and a filter capacitor C4 and DC blocking capacitor C5 are also shown.

Figure 7:
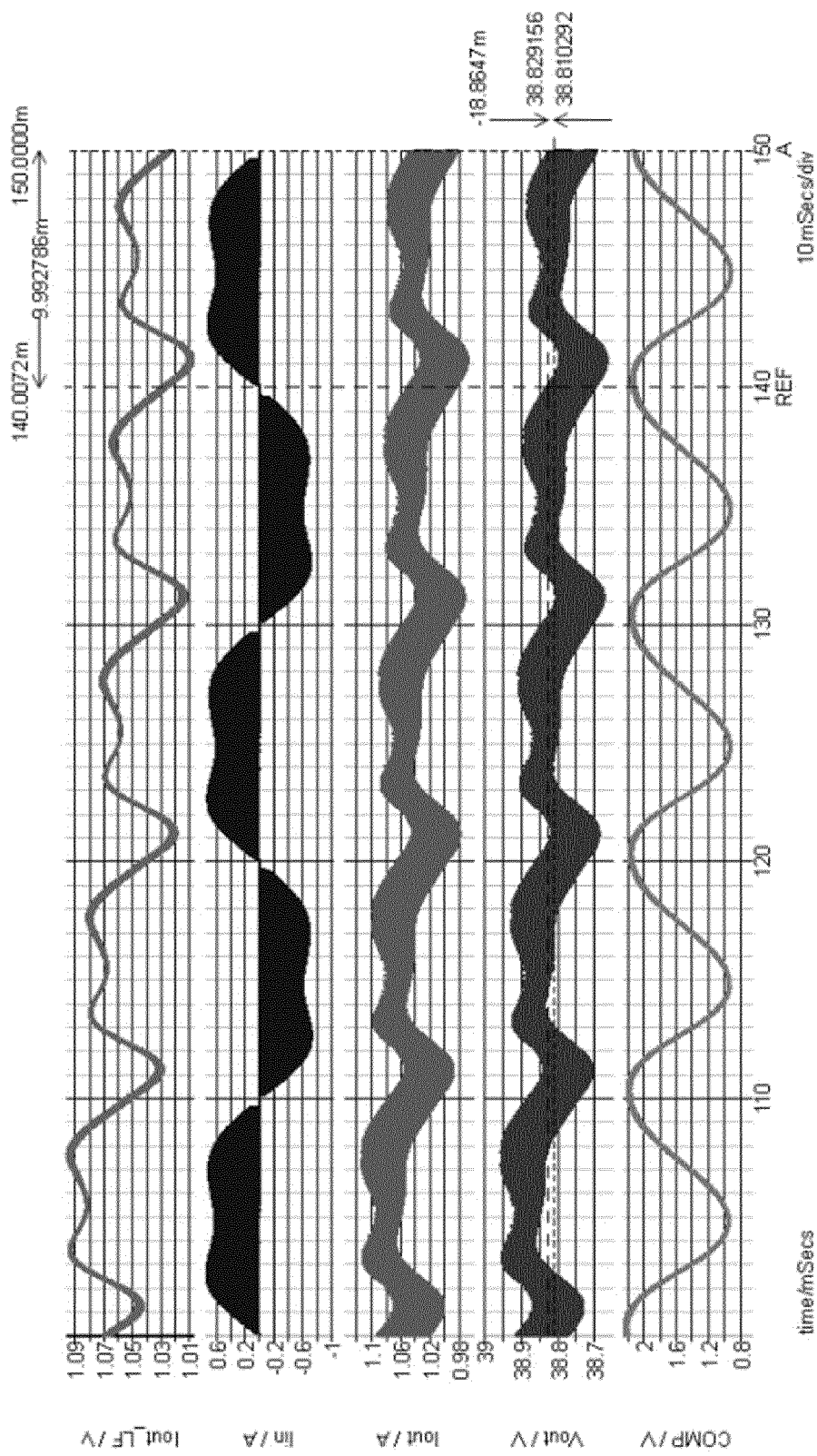
FIG. 7 shows waveforms to illustrate the operation of the circuit of FIG. 6.

FIG. 7 shows a simulation of the LED output current after the compensation circuit.

The plots with thick traces result from the high frequency switching of the converter. The top plot shows the output current Iout after low pass filtering so that the high frequency switching components are removed.

The next plots show the input current Iin, the output current Iout and the output voltage Vout. The bottom plot shows the output "COMP" from the feedback circuit 54.

The ripple in the low pass filtered output current can be calculated as 2.6% which demonstrates that 4% ripple requirement can easily be met.

FIG. 7 shows an enlarged portion of the input current Iin, the current $I_{R2}$ through the sense resistor R2, the low pass version of the sense current $I_{R2\_LPF}$, and the resulting output "COMP" from the feedback circuit 54, which is then used to modify the standard on-time control. The x-axis shows time, and in total it shows one half-cycle of the mains. It also shows an enlarged (along the time axis) part of the input current Iin to show the high frequency components introduced by the converter switching frequency.

The current $I_{R2}$ is positive during operation of the boost converter portion with the switching element off, and is negative during operation of the flyback portion with the switching element on.

The signal COMP is provided to the comparison input pin of a standard on-time control IC to control the regulation of the on-time.

At a phase angle of 0 at the mains (phase angle is shown as φ in FIG. 8), a higher signal COMP will cause a longer on-time. At a 90 degree phase angle a lower value of COMP will reduce the on-time. By optimizing the control parameters, the output current remains stable at all phase angles giving a very low output current ripple.

The invention is of particular interest for a low cost, low output current ripple LED driver.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A boost integrated flyback converter comprising:
an input having first and second terminals;
a boost portion comprising an inductor between one terminal of the input and a switching element; and
a flyback portion comprising a primary winding and a secondary winding, with an energy storage device in series with the primary winding of the flyback portion and an output having first and second terminals defined at the second side,
wherein the converter further comprises:
a current sensing element in series with the energy storage device for sensing an output current from the boost portion when said switching element is switched off and a current discharged from the energy storage device when said switching element is switched on;
a feedback circuit for processing the sensed current to derive a control signal; and
a controller for adjusting the time duration for which the switching element is switched on based on the control signal;
wherein the feedback circuit comprises a low pass filter such that the high frequency switching components of the sensed current are removed to derive the control signal with a level indicative of high and low of the input voltage, and
the controller is adapted to decrease the time duration when the control signal indicates that the input voltage has increased.

2. A converter as claimed in claim 1, wherein the input is adapted to receive an AC mains supply with variable instantaneous amplitude, wherein the feedback circuit is adapted to provide the control signal at a first level when the AC mains supply is at a first instantaneous amplitude and to provide the control signal at a second level when the AC mains supply is at a second instantaneous amplitude lower than said first instantaneous amplitude, wherein the controller is adapted to decrease the time duration when the control signal is at the first level and to increase the time duration when the control signal is at the second level, thereby to smooth the output.

3. A converter as claimed in claim 1, wherein the flyback portion also comprises the switching element, such that the switching element is shared between the boost portion and the flyback portion.

4. A converter as claimed in claim 3, wherein the boost portion comprises an input diode between the inductor and the switching element, and the flyback portion comprises an output diode between the secondary winding and one terminal of the output.

5. A converter as claimed in claim 1, comprising a rectifier between the input and the boost portion.

6. A converter as claimed in claim 1, wherein the current sensing element comprises a resistor connected between a reference potential and the energy storage device, wherein the voltage across the resistor is provided as an input voltage to the feedback element.

7. A converter as claimed in claim 1, wherein the feedback circuit further comprises a voltage amplifier circuit with a gin which varies inversely with the filtered sensed current and in turn the input voltage.

8. A converter as claimed in claim 1, wherein the controller comprises an on-time modulation circuit for controlling the on-time of the switching element, wherein the on-time modulation circuit comprises a comparison circuit for comparing the output of the feedback circuit with a reference input.

9. An LED driver comprising a converter as claimed in claim 1.

10. A lighting circuit comprising:
an LED driver as claimed in claim 9; and
an LED arrangement connected to the output of the LED driver.

11. A method for driving an output load using a BiFRED converter, comprising:
implementing boost conversion using a boost portion of the converter comprising an inductor between one terminal of an input to the boost portion and a switching element;
implementing flyback conversion using a flyback portion comprising a primary winding and a secondary winding, with an energy storage device in series with the primary winding of the flyback portion, and an output defined at the second winding side;
sensing the output current from the boost portion when said switching element is switched off and a current discharged from the energy storage device when said switching element is switched on;
processing the sensed current to derive a control signal; and
adjusting the time duration for which the switching element is turned on based on the control signal;
wherein said step of processing comprises low pass filtering the sensed current such that the high frequency switching components of the sensed current are removed to derive the control signal with a level indicative of high and low of the input voltage; and
the step of adjusting comprises decreasing the time duration when the control signal indicates that the input voltage has increased.

12. A method as claimed in claim 11, comprising providing a voltage across a resistor, connected between a reference potential and the energy storage device, as an input voltage representing the sensed current;
the method is adapted to receive an AC mains supply with variable instantaneous amplitude, wherein the step of processing is adapted to provide the control signal at a first level when the AC mains supply is at a first instantaneous amplitude and to provide the control signal at a second level when the AC mains supply is at a second instantaneous amplitude lower than said first instantaneous amplitude,
wherein the step of adjusting is adapted to decrease the time duration when the control signal is at the first level and to increase the time duration when the control signal is at the second level, thereby to smooth the output.

13. A method as claimed in claim 11, comprising amplifying the input voltage with a gain which varies inversely with the input voltage.

14. A method as claimed in claim 11, comprising controlling the on-time of the switching element based on comparing the processed sensed current with a reference input.

15. An LED driving method comprising driving current through an LED load using the method of claim 10.

* * * * *